(12) United States Patent
Krebs et al.

(10) Patent No.: US 11,805,177 B2
(45) Date of Patent: Oct. 31, 2023

(54) ON-DEMAND START AND STOP OF MANAGED SYSTEMS

(71) Applicant: SAP SE, Walldorf (DE)

(72) Inventors: Rouven Krebs, Roemerberg (DE); Jochen Wilhelm, Sandhausen (DE); Christian Rost, Roemerberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/534,791

(22) Filed: Nov. 24, 2021

(65) Prior Publication Data

US 2023/0164225 A1    May 25, 2023

(51) Int. Cl.

| *H04L 67/141* | (2022.01) |
| *H04L 67/143* | (2022.01) |
| *H04L 9/40* | (2022.01) |
| *G06F 9/455* | (2018.01) |
| *H04L 67/01* | (2022.01) |

(52) U.S. Cl.
CPC ........ *H04L 67/141* (2013.01); *G06F 9/45558* (2013.01); *H04L 63/0823* (2013.01); *H04L 63/108* (2013.01); *H04L 67/01* (2022.05); *H04L 67/143* (2013.01); *G06F 2009/45595* (2013.01)

(58) Field of Classification Search
CPC ... H04L 67/141; H04L 67/01; H04L 63/0823; H04L 63/108; H04L 67/143; G06F 9/45558; G06F 2009/45595
See application file for complete search history.

(56) References Cited

U.S. PATENT DOCUMENTS

| 2006/0230149 | A1* | 10/2006 | Jackson | .............. H04L 67/1008 |
| | | | | 709/226 |
| 2014/0180862 | A1* | 6/2014 | Certain | .................... H04L 15/16 |
| | | | | 705/26.3 |
| 2019/0025903 | A1* | 1/2019 | Mehta | ...................... H04L 67/10 |
| 2020/0233689 | A1* | 7/2020 | Neginhal | ................ G06F 3/067 |
| 2020/0379744 | A1* | 12/2020 | Bhupati | .................. H04L 67/61 |
| 2021/0021584 | A1* | 1/2021 | Buck | ................... G06F 9/45558 |

* cited by examiner

*Primary Examiner* — Chris Parry
*Assistant Examiner* — Steven C Nguyen
(74) *Attorney, Agent, or Firm* — Fountainhead Law Group P.C.

(57) ABSTRACT

Programs, systems, and methods are described for providing on-demand applications to users by infrastructure as a service platforms. A request catcher may receive a request to start an application that runs on a managed system that is scheduled to be off. The request catcher or a management application may verify that the user has authorization to access the application and request to the management application to start the managed system. The management application may start the managed system and the managed system may then provide access to the application to the user.

20 Claims, 7 Drawing Sheets

ON-DEMAND START AND STOP OF MANAGED SYSTEMS

BACKGROUND

1. Field

Embodiments of the present teachings relate to systems and processes for starting offline systems. Specifically, embodiments of the present teachings relate to starting offline systems by non-administrators.

2. Related Art

Typically, in cloud-based infrastructure as a service (IaaS) systems, a user may access systems to run applications provided by centrally located systems. These systems may be provided by a computing service that is accessible by the user based on credentials of the user. Various users may have different credentials for accessing various systems at different times. Furthermore, the cost of the various systems that are accessed may be billed on a per use, or a time, basis. As such, the systems need to be on, and accessible, when a user wishes to access the systems. Furthermore, the systems need to be on during normal operation times such that a user may access the systems when needed. The systems may accumulate costs while the systems are on regardless of whether the user is accessing the systems. Costs may accrue simply while the systems are on, waiting to be used.

Typically, various users will have access to the systems. Information technology (IT) personnel will have administrative rights to access the systems. The IT personnel may assign licenses and access to users to various systems that may be necessary for the various users to perform work. Furthermore, the IT personnel may manage the systems. For example, IT personnel may schedule time frames for systems to be on, off, and scaled in. This management of the systems may correspond to the cost of the systems as the cost may be associated with the scheduled on and scaled-in times of the systems. As such, the IT personnel may schedule when various users are able to access certain systems. Some systems may only be used a few days a week but may be on, and accruing costs, all week. Some systems may be scheduled for particular days but on all day while a user only accesses the system for a few hours. These systems accrue costs while on even though the user is not engaged with the systems the entire time.

Furthermore, the costs for running these systems are typically unknown to the user. IaaS applications typically have no cost transparency for use of the systems through the IaaS programs. The IaaS may provide cost per machine, but they are not aware of the running systems and the processes which belong to the running systems. As such, accurate cost estimates are not provided per system.

What is needed is a system that is on-demand for users such that the users may turn systems on and turn systems off to optimize the costs associated with the systems and provide transparency to the user.

SUMMARY

Embodiments of the disclosure solve the above-described problems by providing programs, systems, and methods for allowing a user of a client device to turn on and off managed systems such that the user may access applications provided by the managed systems. The managed systems may be scheduled to be off to reduce costs associated with running the managed systems and the user, who may not be a systems administrator, may request that the managed systems be turned on to access the applications.

A first embodiment is directed to a method of providing an application on demand by a managed system to a client device. The method comprises receiving, from the client device, a request to start the application, wherein the application is provided by the managed system and the managed system is off, receiving the request at a request catcher; verifying a user of the client device by the request catcher or a management application, sending, by the request catcher, to the management application, confirmation to control the managed system to start, triggering, by the management application, the managed system to start based on the request from the client device and the user verification, and providing the application to the client device.

A second embodiment is directed to a system for providing an application on demand by a managed system to a client device. The system comprises a request catcher receiving, from the client device, a request to start the application, a management application receiving a request from the request catcher to start the managed system, wherein the managed system is scheduled to be off, wherein the request catcher or the management application verifies that a user of the client device has access to the application, wherein the managed system is started by the management application, and wherein the application is provided to the client device by the managed system.

A third embodiment is directed to a system for providing an application on demand by a managed system to a client device. The system comprises a data store, a processor, and one or more non-transitory computer-readable media storing computer-executable instructions that, when executed by the processor, perform a method of the application on demand to the client device. The method comprises receiving, from the client device, a request to start the application, wherein the application is provided by the managed system and the managed system is off, receiving the request at a request catcher, verifying a user of the client device by the request catcher or a management application, sending, by the request catcher, to the management application, confirmation to control the managed system to start, triggering, by the management application, the managed system to start based on the request from the client device and the user verification, and providing the application to the client device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1:
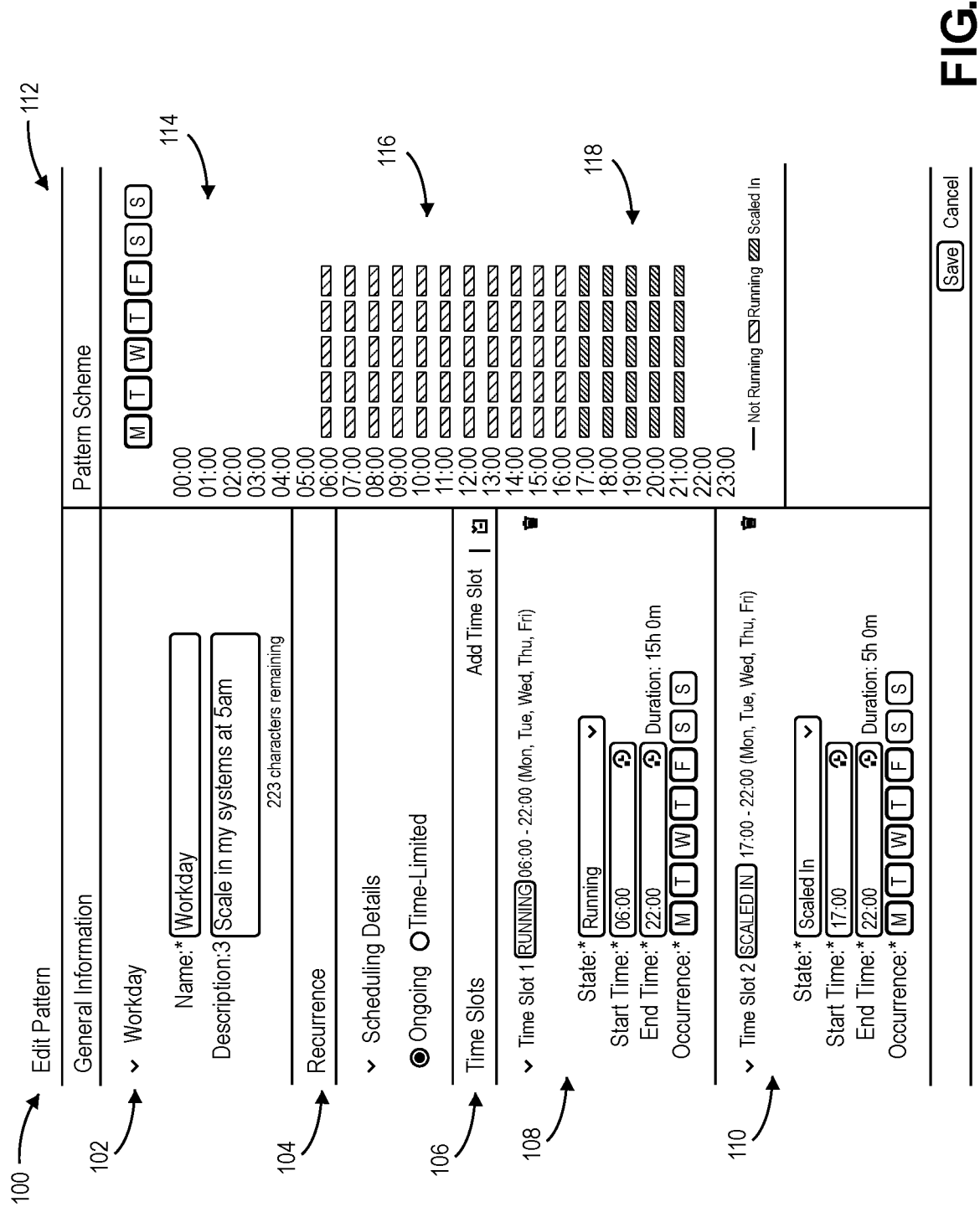
FIG. 1 depicts an exemplary interface for scheduling managed systems.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the present disclosure relate to providing on-demand system start up and shutdown for IaaS applications. In some embodiments, systems may be scheduled for startup and shutdown by a system administrator on the user end. However, the user may wish to access the systems outside of the scheduled times or when the systems are turned off. As such, the user may request startup of the systems. The startup request may be received by a request catcher and the request catcher may communicate with the user to confirm the user's intentions and gather further information from the user. The request catcher may then send the request to a management application system that starts the system as described in embodiments below. As such, the user may start any system that the user wishes to access outside of the scheduled-on times. Furthermore, processes for systems shutdown are described herein such that the user may shut down the systems when the user is finished.

FIG. 1 depicts an exemplary scheduling interface 100 for scheduling time for accessing managed systems. In some embodiments, scheduling interface 100 presents general information 102 for providing a name and a description for the scheduling task. The user creating the schedule may be an administrator on the user end and may provide any information that may be necessary to indicate and describe the scheduling of the managed systems. The user may indicate the recurrence for the schedule as ongoing or time limited at the recurrence menu 104. Scheduling ongoing creates a loop such that the scheduled is repeated each time period such as daily, weekly, monthly, or yearly. Scheduling time-limited provides a time range (or a length of time) or an end date/time for the schedule.

At time slots menu 106, the user may indicate the time slots for which the managed systems may be made available. In some embodiments, various time slots may be scheduled. For example, first time slot 108 may provide access to all managed systems and second time slot 110 may be set for scaled in managed systems that only require some access. For example, all managed systems may be scheduled for a typical work week from 6:00 am until 5:00 pm and scaled-in managed systems may be scheduled from 5:00 pm until 10:00 pm. The time frames may provide full access to all managed systems for a typical work week while also allowing some managed systems to be available for users that work after typical hours.

In some embodiments, time slots menu 106 may be used to schedule time slots by the user for all managed systems simultaneously. In some embodiments, the user may schedule time slots for each individual managed system or application to be used. In some embodiments, many more time slots may be available and provided by time slots menu 106 for scheduling based on cost, time, user, or any other method of scheduling.

In some embodiments, pattern schemes 112 may be presented to the administrative user for schedule visualization. Pattern schemes 112 may provide a table of days and times that represent the managed systems schedules for running, not running, and scaled in. In some embodiments, when managed systems are not running, pattern scheme 112 displays blank schedule 114. When managed systems are running, pattern schemes 112 may display shapes, such as the exemplary rectangles provided, indicating that managed systems are on. When managed systems are scaled in, pattern schemes 112 may display colored shapes indicating that the managed systems are scaled in. For example, running time slots 116 associated with first time slot 108 and scaled-in time slots 118 associated with second time slot 110 are shown with shaded rectangles. The indicia may be any shapes and colors to represent running, not running, and scaled in. In some embodiments, when the user turns a managed system on by utilizing the on-demand start up discussed below, the managed system is displayed on pattern scheme 112.

In some embodiments, scheduling interface 100 may be provided to set a schedule for managed systems to be turned on and off at the will of the systems administrator. The schedule may be based on typical work weeks for the employees of a company to which the systems administrator is associated. The schedule may be made to reduce costs associated with managed systems running while users are not accessing the managed systems to run applications for work. Even if one application server is running then the full cost for using the database is running. As such, companies pay for services even when the services are not being used. The services are paid because the services are available to be used. The systems, programs, and methods described herein optimize the access to the managed systems based on use of the managed systems and cost to the user.

In some embodiments, the end user doesn't have access to start managed systems. The schedule is provided to the user and the administrative user manages the schedule. The user typically does not have access and does not know how to start a managed system.

Figure 2:
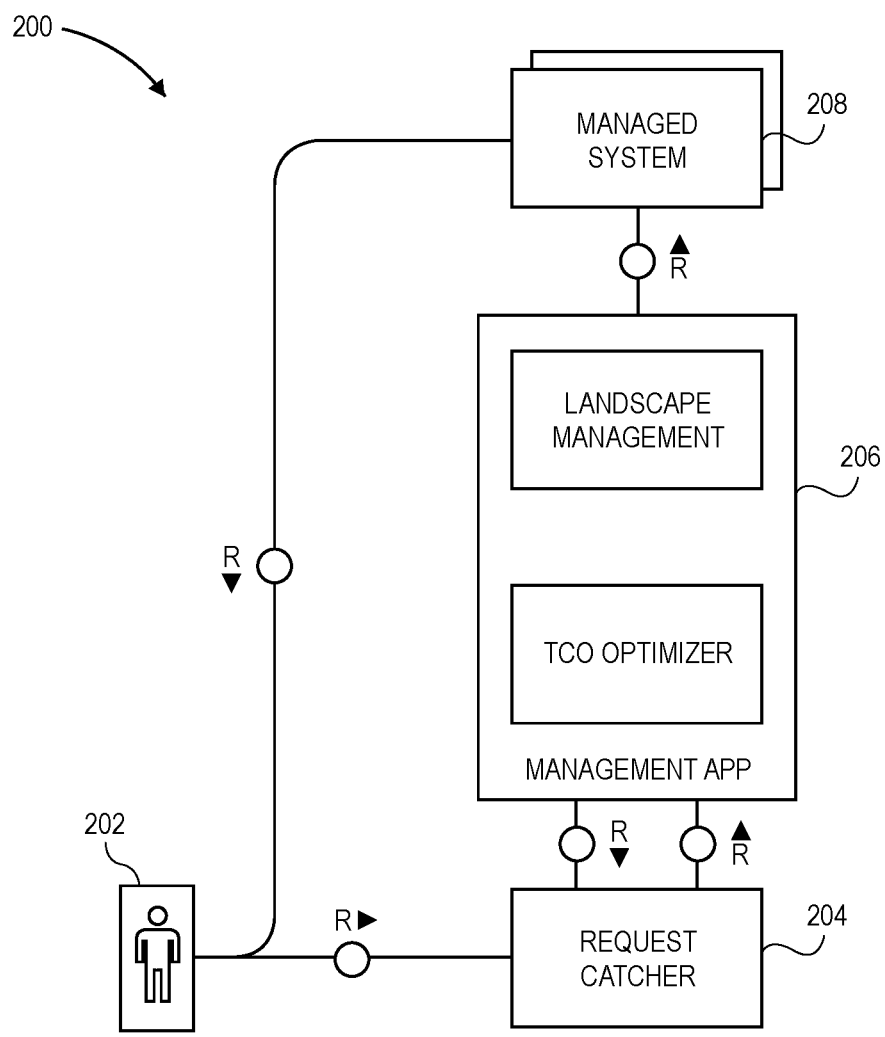
FIG. 2 depicts an exemplary flow diagram for systems described herein.

FIG. 2 depicts exemplary flow diagram 200 representing the process of catching a request from user 202 by request catcher 204 before the request is submitted to management application 206 and managed system 208 are controlled to start, stop, or be scaled in. As such, request catcher 204 may catch requests from user 202 and provide user 202 the ability to start managed system 208 without administrative access. Furthermore, user 202 may start, stop, and scale in managed systems at the convenience of user 202 such that costs to the user may be reduced.

In some embodiments, user 202 may be any user at any company that utilizes managed system 208. User 202 may be any user with standard access to any applications that may be available through the company. As such, user 202 may not be allowed to schedule managed system 208. In some embodiments, only the systems administrator may schedule the managed systems. User 202 may be associated with an individual license or company license that allows access to managed system 208. In some embodiments, management application 206 and request catcher 204 may store or access information associated with user 202 and the associated license such that user 202 is verified prior to providing access to managed system 208.

In some embodiments, managed system 208 may be any system that may provide to user 202 applications that may have controlled access. In some embodiments, managed system 208 may be scheduled on, off, and scaled-in to reduce costs as described above. Managed system 208 may also comprise hostnames, configurations, and licenses to allow user 202 to access managed system 208 and run selected applications. As such, managed system 208 may comprise or otherwise access any applications, applications configurations, and any licenses that allow user 202 to access managed system 208 during times where user 202 is allowed to access managed system 208. As such, during scheduled on and scaled-in times user 202 may access managed system 208 bypassing request catcher 204. During scheduled off and scaled in times, request catcher 204 may catch any requests to access managed system 208.

The scheduling and control of managed system 208 may be performed by management application 206. Management application 206 may receive input by the administrative user and schedule times for managed system 208 to be on, off, and scaled in. The administrative user may access management application 206 and schedule access to managed system 208. In some embodiments, management application 206 comprises landscape management engine and total cost optimization (TCO) engine to control the scheduling and optimization of managed system 208.

In some embodiments, management application 206 controls all aspects of managed system 208. Management application 206 may store or otherwise have access to databases comprising any information necessary for controlling managed system 208 and, in some embodiments, request catcher 204. Management application 206 may store the scheduling tasks for operation of managed system 208 such that managed system 208 may be operational to provide applications to user 202 at the scheduled times. Furthermore, management application 206 may access information associated with user 202 to verify that user 202 has a profile and user identification to access applications associated with managed system 208 and has authorization to start and stop managed system 208.

In some embodiments, user 202 attempts to access managed system 208 while managed system 208 is off. The request may be received by request catcher 204 which may be controlled by management application 206 to start managed system 208 and, in some embodiments, send a request to user 202. In some embodiments, request catcher 204 may communicate with user 202. For example, request catcher 204 may present user 202 a notice that managed system 208 will be available in a certain amount of time based on an average amount of time to start managed system 208 or several processes that need to be performed before managed system 208 is available. Furthermore, request catcher 204 may load a landing page that requests information from user 202 as described in detail below.

In some embodiments, request catcher 204 may present the landing page as consistently with the appearance and interaction as managed system 208 as request catcher 204 and managed system 208 may run the same protocol (e.g., hypertext transfer protocol secure (https)). As such, request catcher 204 may operate similarly to managed system 208 at a protocol level to provide the landing page and interact with user 202. In some embodiments, request catcher 204 may be bypassed and the landing page and any landing page functionality described herein, may be provided by management application 206. For example, https may be used, and a hostname, an Internet Protocol (IP) address, and a certificate may be provided. In some embodiments, the landing page may present a time for startup and access of managed system 208. In some embodiments, if the time range for use of managed system 208 is known, or is input by user 202, the landing page may display an estimated cost. Furthermore, the landing page may request verification from user 202 that user 202 wishes to start managed system 208 and run managed system 208 for the designated time range.

Figure 3:
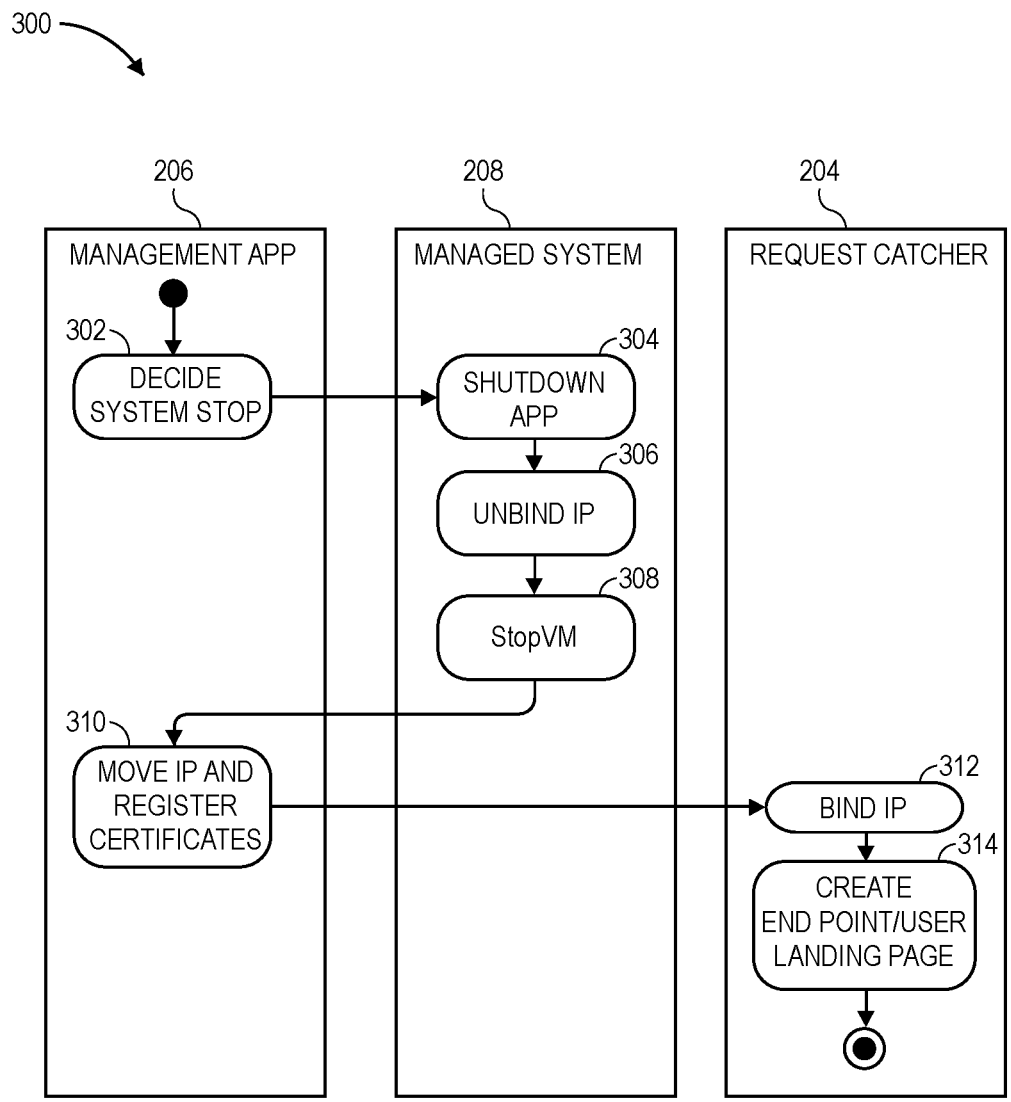
FIG. 3 depicts an exemplary flow diagram for shutting down a managed system by an end user.

FIG. 3 depicts an exemplary process of stopping the managed system 208 by management application 206 generally referenced by numeral 300. At step 302 user 202 may decide to stop managed system 208 or managed system 208 may be scheduled to stop. In some embodiments, a scheduled time for managed system 208 may run out or a lack of interaction with managed system 208 may result in a time-out of managed system 208 and managed system 208 may be stopped automatically. Management application 206 or managed system 208 may continually or periodically monitor the application to verify that the application is in use. If the application is not in use for a predetermined amount of time, the application may be stopped and managed system 208 may be shut down. The request to shut down managed system 208 may be received and controlled by management application 206 or management application 206 may automatically stop managed system 208.

In some embodiments, at step 304, the application running on managed system 208 may be shut down. Any application that may be running on managed system 208 and accessed by user 202 may be shut down. The application may be any virtual application running on the device of the user 202 and by a virtual machine. The application may be any application that the company provides for user 202 to perform work.

At step 306, the IP address may be unbound. As the managed system is not necessarily hard-wired to the machine of user 202, it may not be necessary to unbind the IP address. As such, when the virtual machine is stopped, at step 308, the IP address will no longer be available in the network. Managed system 208 may stop service to user 202, as such virtual machine may be stopped, and the IP address may no longer be available or may be unbound prior to stopping service.

At step 310, the IP address, certificates, licenses, hostnames, and the like may be moved to management application 206 for providing the communication connection and validation of the user and the client device by comparison to stored identification information of the user. Furthermore, any certificates and the like associated with the user and the client device may be registered. The information moved to management application 206 may be stored for future use. Furthermore, at step 312 and step 314, management application 206 may then control request catcher 204 to bind the IP address and create an endpoint for user at request catcher 204. A landing page may be created for the hostname and IP address for interacting with user 202 to fulfill the requests of user 202. The landing page may receive instructions from user 202 as to which managed systems to start, or simply inform user 202 that the managed system 208 will start automatically in a particular time period. As such, when user 202 request for restart of managed system 208, request catcher 204 may interact with user 202 via the user landing page and fulfill the request of user 202 as shown in FIG. 4 and described below.

Figure 4:
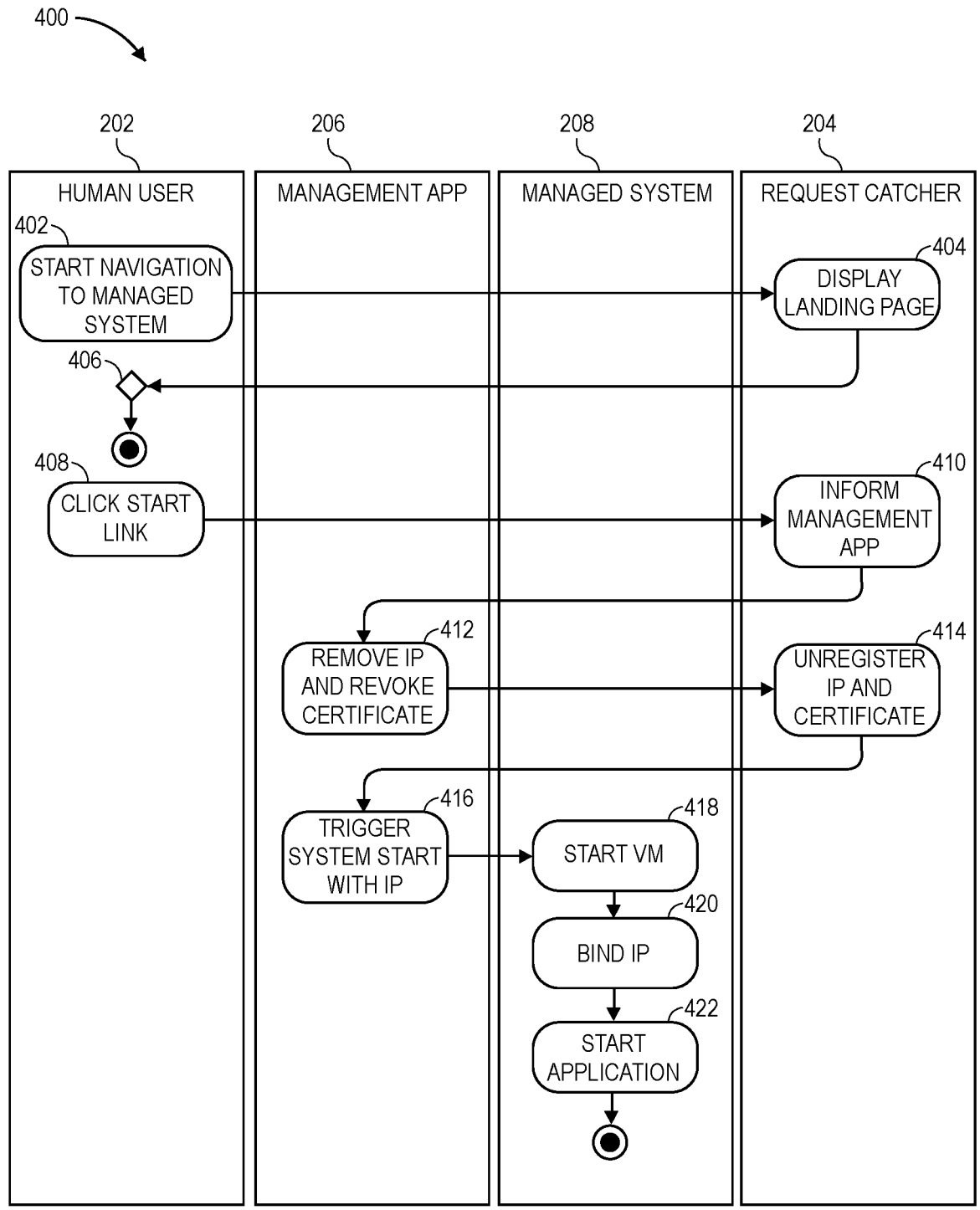
FIG. 4 depicts an exemplary flow diagram for starting the managed system by the end user.

FIG. 4 depicts an exemplary flow diagram of starting managed system 208 by user 202 generally referenced by numeral 400. User 202 may initiate navigation to managed system 208 at step 402. User 202 may initiate the navigation to managed system 208 by selecting to open an application provided by managed system 208 at the user device. Because managed system 208 is shut down and the application is not available, request catcher 204 may receive the indication that user 202 is attempting to open the application. As described above, user 202 may be any user of a company device accessing applications with licenses to those applications provided by managed system 208. Furthermore, in some embodiments, user 202 may not have administrator credentials. As such, user 202 may not perform administrative tasks such as scheduling managed system 208. User 202 may select to open managed system 208 which, in some embodiments, may be a virtual machine providing access to the cloud-based applications that user 202 may use to perform work. If user 202 requests to open managed system 208 during scheduled accessible hours such as, for example, when managed system 208 are running or in scale-in mode, user 202 may be provided access directly to managed system 208. When user 202 attempts to open managed system 208 when managed system 208 are outside of scheduled hours, or off, the request may be received by request catcher 204.

User 202 may attempt to access managed system 208 outside of scheduled access hours as described in embodiments above. As such, request catcher 204 may receive the request to open managed system 208 at step 404 and generate, or otherwise cause for display, the landing page. The landing page may be displayed to user 202 at step 406. In some embodiments, the landing page may provide a table, or list, of managed systems that may be started by user 202. User may select managed systems to be started and submit the list of managed systems to request catcher 204. In some embodiments, no list is provided and user 202 is provided the landing page presenting an estimated time that managed system 208 will automatically start. In some embodiments, the landing page requests additional information from user 202 such as, for example, time and time range that managed system 208 is needed, a maximum cost associated with the use of managed system 208, credential information of user 202 to verify access, and the like.

At step 408, user 202 may select to start managed system 208. User 202 may be presented the landing page as described above. The landing page may comprise interaction elements for user 202 to select. The selections may be of applications hosted by managed system 208 to start or selections of times and time ranges for running managed system 208. Upon selection of the interaction element, at step 410, request catcher 204 may receive the selection and send to management application 206. In some embodiments, step 408 is omitted, and the request is sent directly to management application 206 to start managed system 208 automatically when user 202 is verified and certification exists to start managed system 208 and the associated application.

At step 412, management application 206 may remove the IP address from request catcher 204 and revoke certificates, issue new certificate, or updated certificates. In some embodiments, the certificates may be copied and pasted in request catcher 204. In some embodiments, the certificate may be stored at request catcher 204. If the IP address is bound, the IP address may be unregistered at request catcher 204 at step 414. At step 416, management application 206 may trigger start of the virtual machine for managed system 208 using the IP address.

At steps 418, 420, and 422 the virtual machine is started, the IP address is bound, and the application is started. The virtual machine may be initiated, and IP address may be bound such that the application can be provided to user 202 by a user client device associated with the bound IP address.

In some embodiments, an interactive on-demand startup may be restricted by users. In some embodiments, the work being performed may be proprietary or secret and, therefore, several people must be present or a particular person with authorization must be present. As such, the authorized user or a plurality of users may request startup for managed system 208 to start. Similarly, the cost may be high for managed system 208 to run. Therefore, it may only be cost beneficial to run managed system 208 when at least two, three, four, or any number of users are working on managed system 208. As such, managed system 208 may only start when requested by a minimum number of users.

Furthermore, startup of managed system 208 may be regulated by time. User 202 may not have access to managed system 208 at any time. For example, some applications may be limited to specific time periods for on-demand startup. These applications may be expensive, so time in use may be restricted to cut costs. The time for accessing managed system 208 may be regulated and scheduled to a specific time. In some embodiments, a plurality of people may be present during specific time periods such as, a council or during scheduled conferences. As such, managed system 208 may only be started during those time frames.

In some embodiments, an external user who is external to the company to which the application is licensed may access and use managed system 208. The external user may be a user known to managed system 208. For example, the external user may have a stored profile and user identification number accessible by management application 206 and managed system 208 for accessing managed system 208. As such, the cost may be billed directly to the external user, or a company associated with the external user. As such, if users are known, the users may access managed system 208 from any location and be billed accordingly.

Figure 5:
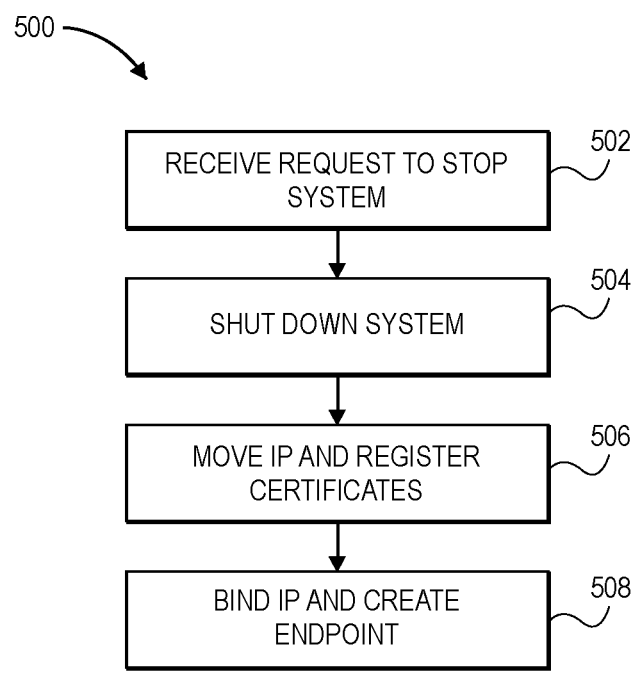
FIG. 5 depicts an exemplary process for shutting down the managed system by the end user.

FIG. 5 depicts an exemplary process for stopping managed system generally referenced by numeral 500. At step 502, a request, from user 202, to stop an application provided by managed system 208 may be received. User 202 may be any user starting an application and may not have administrative access. In some embodiments, managed system 208 is scheduled to stop at scheduled times and the request to stop is managed by management application 206.

At step 504, managed system 208 is shut down as described in embodiments above. In some embodiments, managed system 208 may shut down the application, unbind the IP address and stop the virtual machine. In some embodiments it may not be necessary to unbind the IP address as the IP address will no longer be in the network when managed system 208 is off.

At step 506, the IP address, certificates, licenses, hostnames, and the like may be moved to management application 206. The information moved to management application 206 may be stored and used to create an endpoint for later use. Furthermore, the information stored maybe used at request catcher 204 to bind the IP address and create the endpoint at step 508 as described in embodiments above. The endpoint may be used to initiate startup of managed system 208 when user 202 is requests startup of managed system 208.

Figure 6:
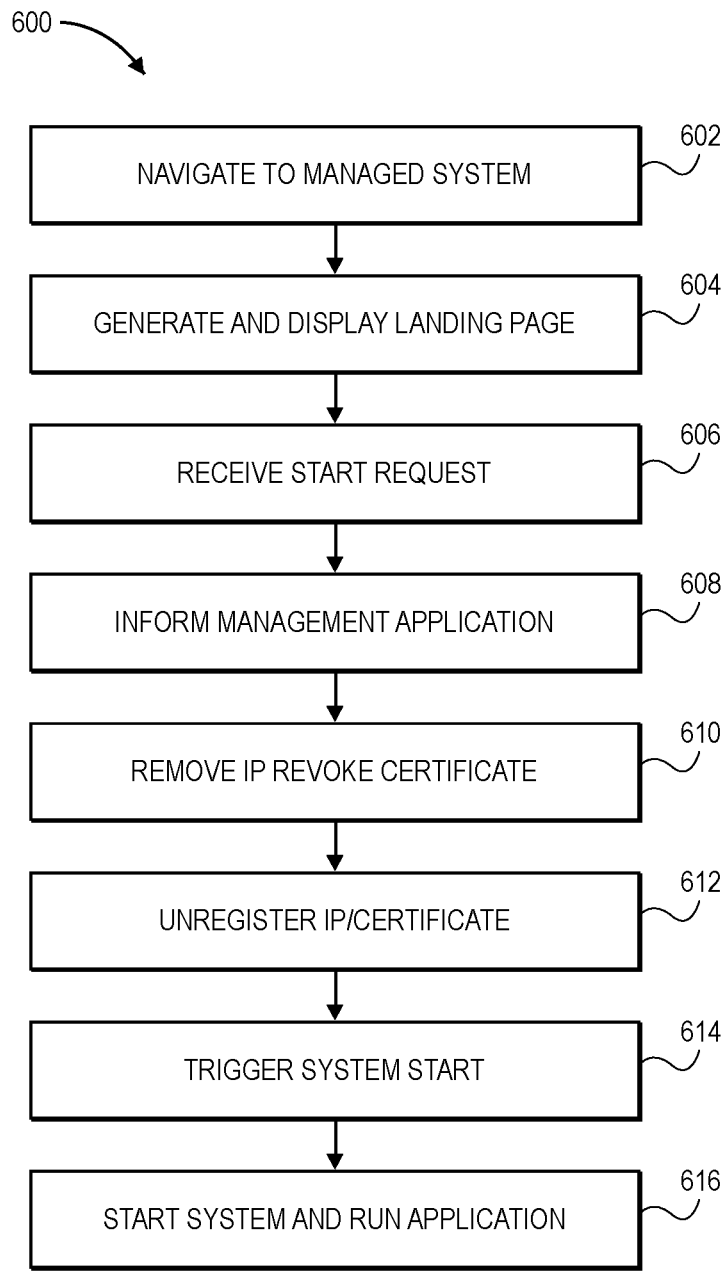
FIG. 6 depicts an exemplary process for starting the managed system by the end user.

FIG. 6 depicts an exemplary processor for starting stopped managed system 208 generally referenced by numeral 600. At step 602 user 202 may initiate navigation to managed system 208 as described in embodiments above. In some embodiments, user 202 may attempt to open an application provided by managed system 208. Because managed system 208 is shut down and the application is not available, request catcher 204 may receive the indication that user 202 is attempting to open the application. As such, request catcher 204 may check the credentials of user 202 and, if user 202 is authorized or licensed to access the application, automatically send a request to management application to start managed system 208 or cause for display the landing page to user 202 at step 604.

At step 604, the landing page may be displayed to user 202. In some embodiments, the landing page may be presented to user 202. The landing page may comprise information to aid user 202 such as, for example, estimated time to start the application. Furthermore, the landing page may provide questions and inputs to obtain information from user 202. For example, the landing page may request which applications user 202 would like to open and for how long. Furthermore, management application 206 may calculate an estimated cost based on the requested application and startup of managed system 208. As such, an estimated cost per time range may be provided by the landing page. The landing page may request that user 202 input a time range for use of managed system 208. The landing page may further provide a cost estimate and request confirmation from user 202 that user 202 wishes to start managed system 208. In some embodiments, the landing page may simply provide an explanation that managed system 208 is off and that starting managed system 208 will accrue costs and request confirmation that user 202 wishes to start managed system 208.

At step 606, request catcher 204 may receive confirmation from user 202 to start managed system 208. Request catcher 204, may verify user 202 and send the start request to management application 206 to start managed system 208 or otherwise notify management application 206 that the request is received at step 608. Management application 206 may receive the request/notification and perform functions to start managed system 208. For example, management application 206, at step 610, may remove the IP address and revoke certificates, issue new certificate, or updated certificates. In some embodiments, the certificates may be copied and pasted in request catcher 204. At step 612, request catcher may subsequently unregister the IP address and any certificates previously associated with user 202.

At step 614, management application 206 may trigger start of the managed system 208 by controlling managed system based on the stored information of management application 206. At step 616, managed system 208 may start the virtual machine for running the application, bind the IP address for communication, and start the application to run on the virtual machine. The application may run if user 202 wishes or as long as was previously scheduled. When user 202 is finished, managed system 208 may shut down as described in embodiments above.

Figure 7:
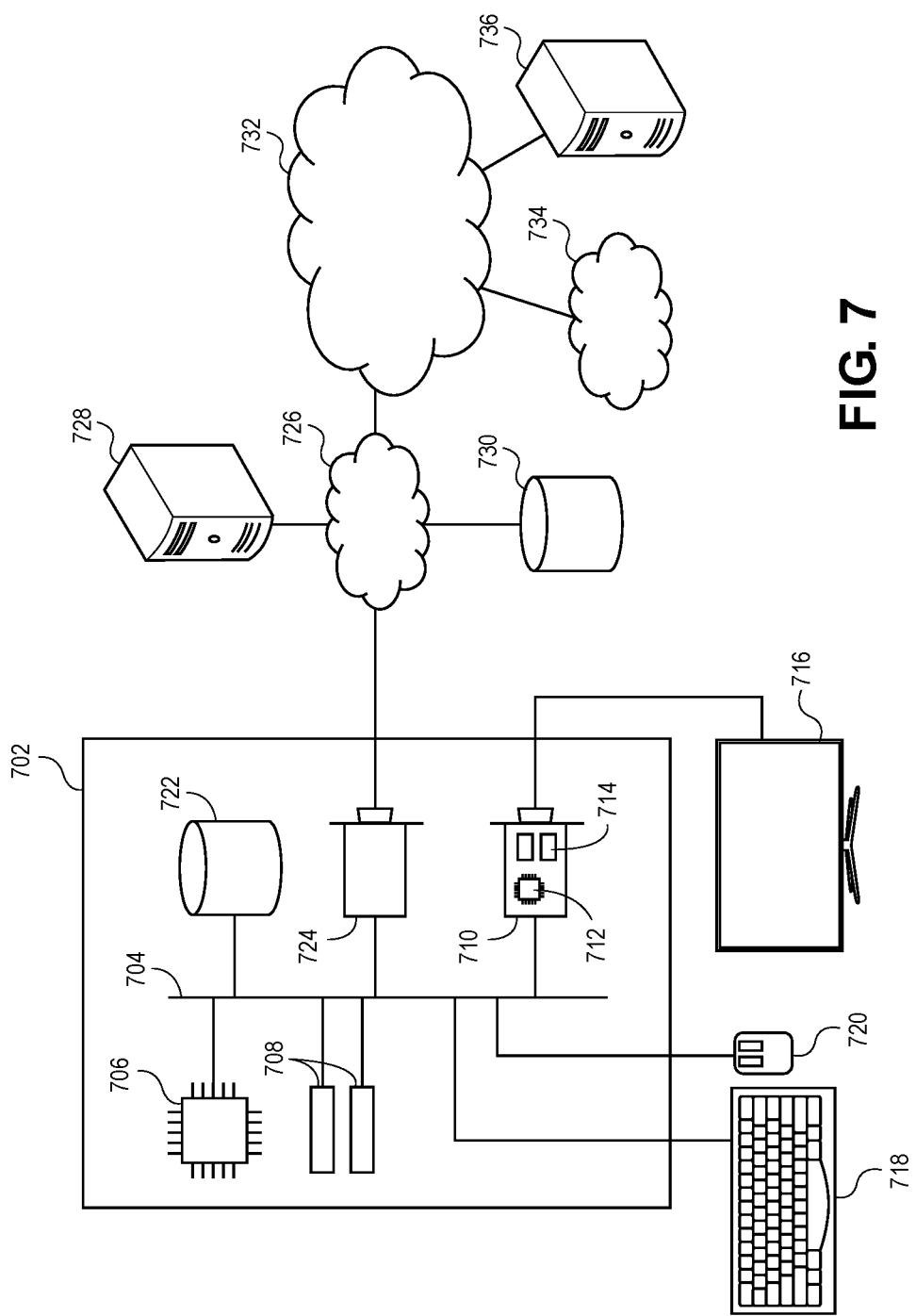
FIG. 7 depicts an exemplary embodiment of a hardware platform for use with embodiments of the present disclosure.

Turning to FIG. 7, an exemplary hardware platform that can form one element of certain embodiments of the disclosure is depicted. Computer 702 can be a desktop computer, a laptop computer, a server computer, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 724 is also attached to system bus 704 and allows computer 702 to communicate over a network such as local network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. A method of providing an application on demand by a managed system to a client device, the method comprising:
   receiving, from the client device in a request catcher, a request to start the application, wherein the application is provided by the managed system and the managed system is turned off by a management application, and wherein the management application moves connection and user validation information from the managed system to the management application when the managed system is turned off;
   controlling the request catcher, by the management application, to bind an Internet Protocol (IP) address in the connection and user validation information to create an endpoint for a user at the request catcher;
   receiving, in the request catcher, instructions from the user specifying the managed system to start;
   sending, by the request catcher, to the management application, confirmation to control the managed system to start, wherein the management application comprises a scheduling engine configured to schedule time for accessing managed systems based on costs associated with operating the managed systems, a number of users using the application, and an activity level associated with the application;
   triggering, by the management application, the managed system to start based on the request from the client device; and
   providing the application to the client device by the managed system.

2. The method of claim 1, further comprising:
   wherein the managed system is controlled to be turned off by the management application based on a stored schedule providing on and off times for the managed system.

3. The method of claim 1, upon receiving the request to start the managed system, further comprising:
   unregistering a certificate by the request catcher; and
   starting a virtual machine, binding an Internet Protocol address, and starting the application by the managed system.

4. The method of claim 1, further comprising generating, by the request catcher, a landing page for display by the client device.

5. The method of claim 4, further comprising:
   displaying, by the landing page, a time interaction element requesting a length of time for the managed system to run;
   wherein the landing page further comprises an estimate of a cost of starting and running the managed system, and
   wherein the landing page comprises an interaction element requesting a user to confirm the request to start the managed system.

6. The method of claim 1, further comprising:
   continuously monitoring the managed system for active use;
   if the managed system has not received input for a specified time period, transmit a notification to the client device; and
   if no response is received from the client device, shutting down the managed system.

7. The method of claim 1, further comprising: verifying the user of the client device by the request catcher or the management application; storing a certificate by the request catcher; comparing the certificate with information indicative of a server; and allowing the user to start the managed system based at least in part on the comparing and the verifying of the user.

8. The method of claim 1, further comprising:
   receiving, by the client device, a shutdown request to shut down the managed system;
   upon receiving the request to shut down the managed system:
      shutting down the application, unbinding an Internet Protocol address, and stopping a virtual machine by the managed system;
      moving the Internet Protocol address to the management application and registering a certificate; and
      binding the Internet Protocol address and creating an endpoint at the request catcher.

9. A computer system comprising one or more processors for providing an application on demand by a managed system to a client device, the computer system comprising:
   a request catcher receiving, from the client device, a request to start the application;
   a management application receiving a request from the request catcher to start the managed system, wherein the management application comprises a scheduling engine configured to schedule time for accessing managed systems based on costs associated with operating the managed system, a number of users using the application, and an activity level associated with the application;
   wherein the managed system is scheduled to be turned off by the management application, and wherein the management application moves connection and user validation information from the managed system to the management application when the managed system is turned off;
   wherein the request catcher is controlled, by the management application, to bind an Internet Protocol UP) address in the connection and user validation information to create an endpoint for a user at the request catcher;
   wherein the request catcher receives instructions from the user specifying the managed system to start;

wherein the managed system is started by the management application, and wherein the application is provided to the client device by the managed system.

10. The computer system of claim 9,
wherein an Internet Protocol address is removed, and a certificate is revoked by the management application,
wherein the certificate is unregistered by the request catcher,
wherein the managed system is started by the management application using the Internet Protocol address, and
wherein a virtual machine is started, the Internet Protocol address is bound, and the application is started by the managed system.

11. The computer system of claim 9,
wherein a shutdown request is received from the client device to shut down the managed system,
wherein the application is shut down, an Internet Protocol address is unbound, and a virtual machine is stopped by the managed system,
wherein the internet protocol address is moved to the management application and a certificate is registered, and
wherein the Internet Protocol address is bound, and an endpoint is created at the request catcher.

12. The computer system of claim 9,
wherein a landing page is caused for display by the request catcher for display by the client device,
wherein the landing page comprises an estimate of a cost of starting and running the managed system, and
wherein the landing page comprises an interaction element requesting a user to confirm the request to start the managed system.

13. The computer system of claim 12,
wherein a time interaction element is displayed by the landing page requesting a length of time for the managed system to run, and
wherein the managed system is monitored for active use, and if the managed system has not received input for a specified time period, the managed system is shut down.

14. The computer system of claim 9,
wherein the request catcher or the management application verifies that the user of the client device is authorized to access the application, wherein a certificate is stored by the request catcher, wherein the certificate is compared to information indicative of a server, and wherein the managed system is started based at least in part on the comparing and the verifying of the user.

15. A system for providing an application on demand by a managed system to a client device, the system comprising:
a data store;
a processor;
one or more non-transitory computer-readable media storing computer-executable instructions that, when executed by the processor, perform a method of providing the application on demand to the client device, the method comprising:
receiving, from the client device in a request catcher, a request to start the application, wherein the application is provided by the managed system and the managed system is turned off by a management application, and wherein the management application moves connection and user validation information from the managed system to the management application when the managed system is turned off;
controlling the request catcher, by the management application, to bind an Internet Protocol (IP) address in the connection and user validation information to create an endpoint for a user at the request catcher;
receiving, in the request catcher, instructions from the user specifying a managed system to start;
sending, by the request catcher, to the management application, confirmation to control the managed system to start, wherein the management application comprises a scheduling engine configured to schedule time for accessing managed systems based on costs associated with operating the managed systems, a number of users using the application, and an activity level associated with the application;
triggering, by the management application, the managed system to start based on the request from the client device and user verification; and
providing the application to the client device.

16. The system of claim 15, wherein the managed system is controlled to be turned off by the management application based on a stored schedule providing on and off times for the managed system.

17. The system of claim 15, upon receiving the request to start the managed system, the computer-executable instructions are further executed to perform:
unregistering a certificate by the request catcher; and
starting a virtual machine, binding an Internet Protocol address, and starting the application by the managed system.

18. The system of claim 15, wherein the computer-executable instructions are further executed to perform:
generating, by the request catcher, a landing page for display by the client device,
wherein the landing page further comprises an estimate of a cost of starting and running the managed system, and
wherein the landing page comprises an interaction element requesting a user to confirm the request to start the managed system.

19. The system of claim 15, wherein the computer-executable instructions are further executed to perform:
storing a certificate by the request catcher;
comparing the certificate with information indicative of a user; and
allowing the user to start the managed system based at least in part on the comparing.

20. The system of claim 15, wherein the computer-executable instructions are further executed to perform:
receiving, by the client device, a shutdown request to shut down the managed system;
upon receiving the request to shut down the managed system:
shutting down the application, unbinding an Internet Protocol address, and stopping a virtual machine by the managed system;
moving the Internet Protocol address to the management application and registering a certificate; and
binding the Internet Protocol address and creating an endpoint at the request catcher.

* * * * *